US006427848B1

(12) United States Patent
Shih

(10) Patent No.: US 6,427,848 B1
(45) Date of Patent: Aug. 6, 2002

(54) DUAL FABRICATION LIQUID CIRCULATORY SYSTEM FOR AN ELECTRIC DISCHARGE FABRICATION MACHINE

(76) Inventor: Chiao-Chin Shih, No. 6, Lane 1, Ta Hsin Road, Pu Yen Hsiang, Chang Hua Hsien (TW)

( * ) Notice: Subject to any disclaimer, the term of this patent is extended or adjusted under 35 U.S.C. 154(b) by 0 days.

(21) Appl. No.: 09/594,826

(22) Filed: Jun. 16, 2000

(51) Int. Cl.[7] ............................ C02F 9/00; B01D 17/00

(52) U.S. Cl. ....................... 210/533; 210/252; 210/255; 210/257.1; 210/513; 210/532.1; 210/538; 210/540

(58) Field of Search .............................. 210/513, 532.1, 210/540, 252, 255, 257.1, 533, 538

(56) References Cited

U.S. PATENT DOCUMENTS 4,915,823 A * 4/1990 Hall ........................... 210/299
5,560,826 A * 10/1996 Szereday et al. ........... 210/522
5,851,386 A * 12/1998 Paul ........................ 210/532.1

* cited by examiner

*Primary Examiner*—David A. Reifsnyder
(74) *Attorney, Agent, or Firm*—Troxell Law Office PLLC

(57) ABSTRACT

An improved dual fabrication liquid circulatory system for an electric discharge fabrication machine, having an oily-water separation system of single, dual, or triple-tank types. The single-tank oily-water separation system utilizes a water level sensor to control the switch of an electric magnetic valve and the discharge of oily-water fabrication liquid from an oil discharge pipe and a water discharge pipe. The dual-tank oily-water separation system directs fabrication liquid into a filtration tank such that fabrication liquid enters a water storage tank through a water discharge pipe and the floating oil flows into an oil storage tank from an oil discharge pipe. The triple-tank oily-water separation system includes a water filtration tank and an oil filtration tank with the water filtration tank divided into two tanks by a separation board. The floating oil in the upper oil layer enters an oil filtration tank through a flow pipe and enters the oil storage tank through an oil discharge pipe.

3 Claims, 4 Drawing Sheets

DUAL FABRICATION LIQUID CIRCULATORY SYSTEM FOR AN ELECTRIC DISCHARGE FABRICATION MACHINE

BACKGROUND OF THE INVENTION

1) Field of the Invention

An improved dual fabrication liquid circulatory system for an electric discharge fabrication machine is disclosed including an oily-water separation system located on the bottom of a fabrication liquid collection tank. An oil storage tank and a water storage tank are set below the oily-water separation system. Because the oily-water separation system is directly installed on the top of an oil storage tank and a water storage tank, no additional space is required for the structure.

2) Description of the Prior Art

Please refer to FIG. 1, which illustrates a liquid supply system for prior electric-discharge fabrication machines. Liquid passes from fabrication head T1, to work platform T2, to fabrication liquid collection tank T3, to fabrication liquid filtration tank T4 and through filtration net T5 for impurity filtration. High-pressure pump T6 is used for impurity removal, and liquid supply pipe T7 is used for transporting the fabrication liquid to the fabrication head. However, the above liquid supply system is a single fabrication liquid supply system. Single fabrication liquid results in various defects. If water is supplied as the fabrication liquid, the fabricated thread-hole for aluminum is non-electrically conductive, thus causing serious hole-enlargement phenomenon. If oil is supplied as the fabrication liquid, the fabrication speed for steel is too slow. If various fabrication liquids are utilized for diversified material, the defects such as time waste during the changing process, the need of cleaning system pipes, and the waster of fabrication liquid will be caused.

Another known liquid supply system for a fabrication machine with thread-hole electric-discharge with a dual fabrication liquid circulation is set forth in U.S. Pat. No. 5,972,209 for aluminum wolfram steel and common steel material. Although it combines the advantages of water and oil fabrication liquid (i.e., the advantage of quick thread-hole fabrication for water, aluminum, EDM oil and prevents the inconvenience in cleaning liquid supply system and enhancement of work efficiency), the whole structure is on a large scale due to structural properties. It has a large cleaning area and causes inconvenient cleaning. The volume for oily-water storage is reduced, thus the amount of oily-water for circulation is decreased. For stored oily-water, the circulation time period is reduced and the temperature increases due to heat generation during electric discharge fabrication. It causes the oily-water to be spoiled due to quick circulation which decreases the quality of the electric discharge fabrication. The application extent for such a system is thus limited and further improvement is required.

SUMMARY OF THE INVENTION

The primary objective of the invention is to provide an improved dual fabrication liquid circulatory system for electric discharge fabrication machines. An oily-water separation system is located on the bottom of a fabrication liquid collection tank. An oil storage tank and a water storage tank are set below an oily-water separation system, the oily-water separation system for fabrication liquid filtration being directly installed on the top of an oil storage tank and a water storage tank.

No space for the oily-water separation system is needed in the water and oil storage tanks and the volumes for the water storage tank and the oil storage tank are increased. Thus, the present system is able to increase storage volume within a limited space and increase the duration of circulation for the fabrication liquid inside a tank to avoid rising temperature.

An additional objective of the invention is to provide an improved dual fabrication liquid circulatory system for an electric discharge fabrication machine wherein the oily-water separation system is directly installed on the top of an oil storage tank and a water storage tank. The volume of the whole structure for the oily-water separation system in filtering impurities and steel pieces is relatively small. Thus, the cleaning area for an electric-discharge oily-water fabrication machine in filtering impurities and steel pieces is shortened and cleaning convenience is achieved.

The following are brief descriptions for optimal embodiments of the invention for better understanding of the structural characteristics and operations of the invention.

DETAILED DESCRIPTION OF THE PREFERRED EMBODIMENT

Figure 1:
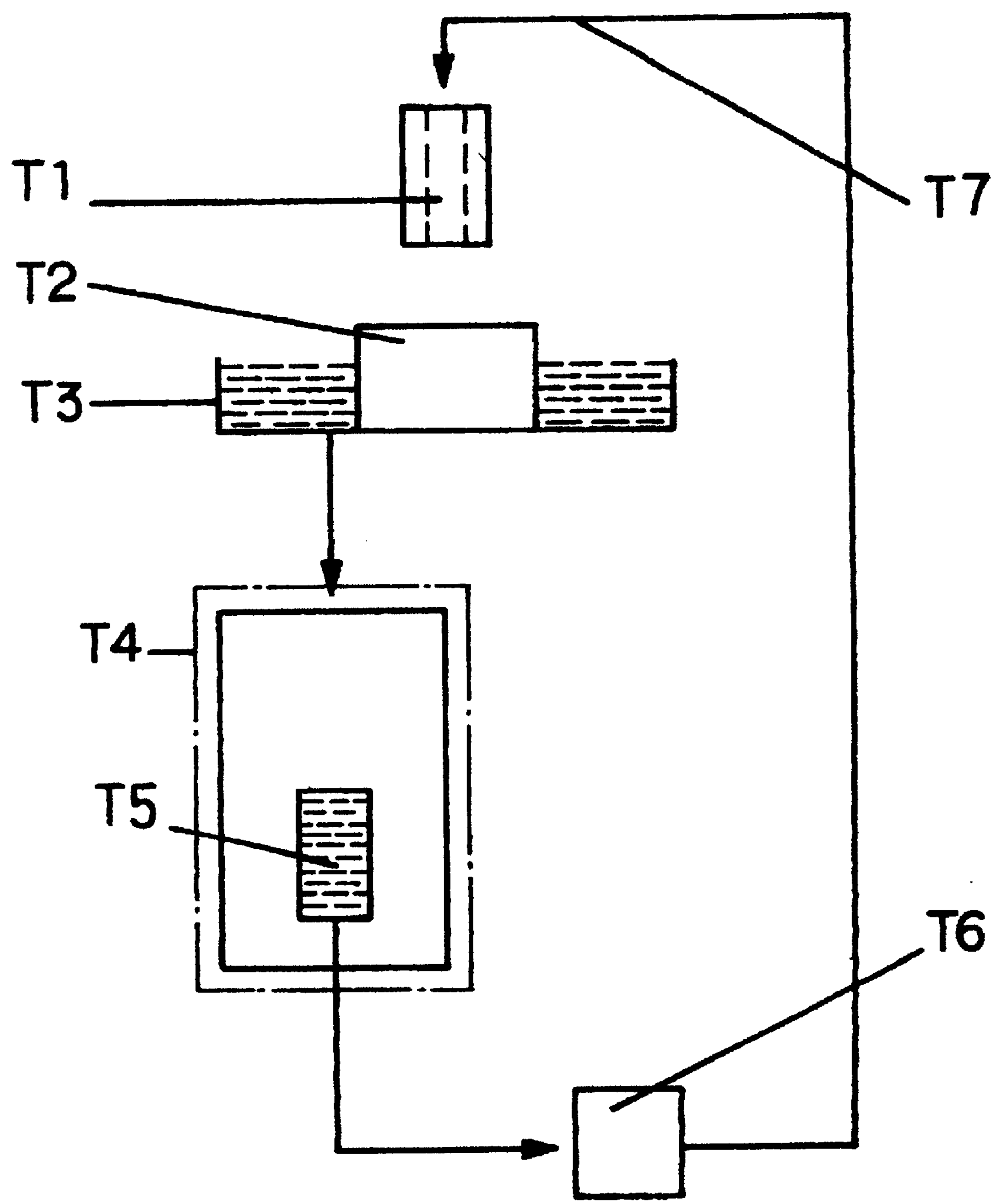
FIG. 1 is a liquid supply systematic drawing for prior electric-discharge fabrication machine.
Figure 2:
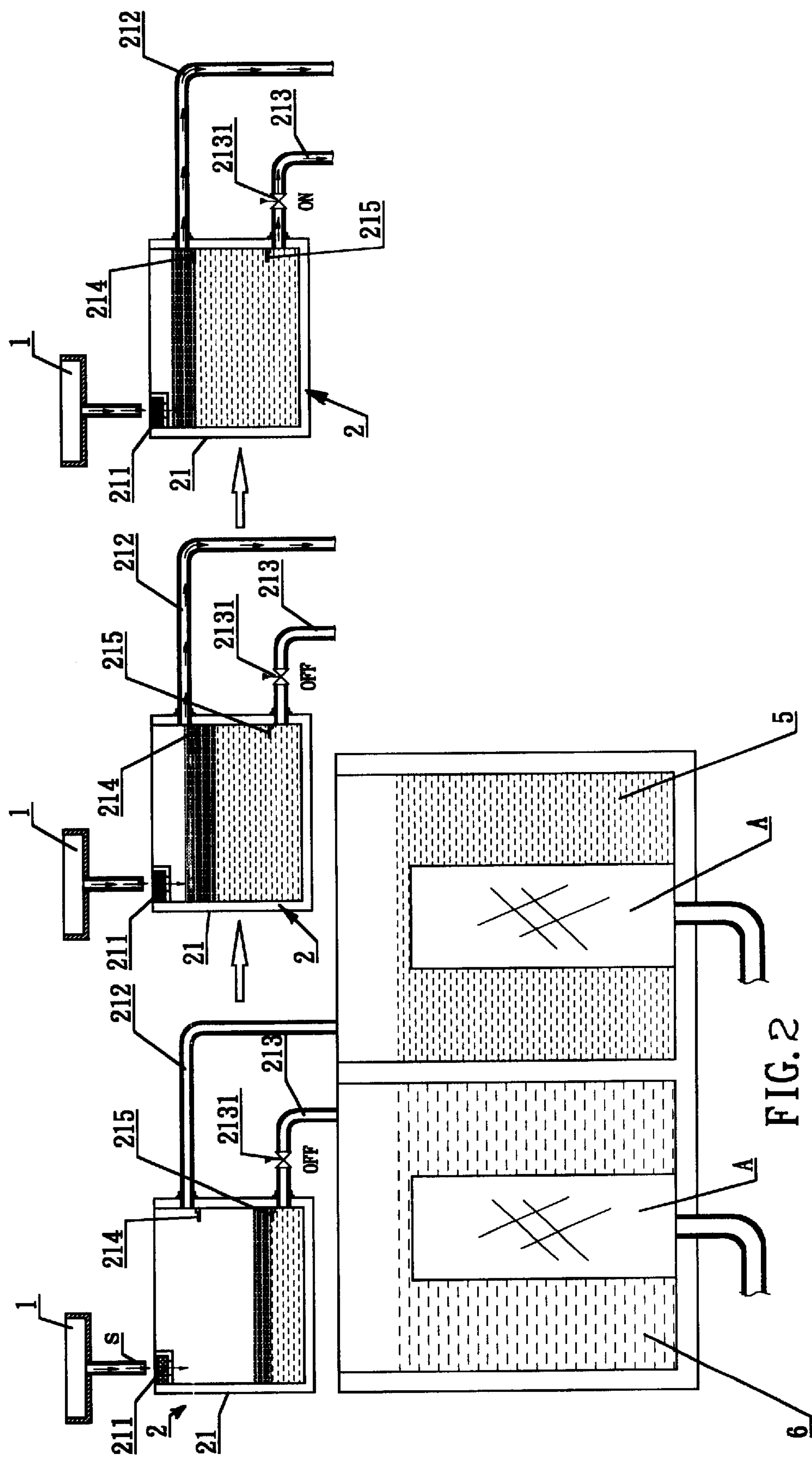
FIG. 2 is a schematic drawing of a single-tank system for an electric-discharge fabrication machine according to the present invention.
Figure 3:
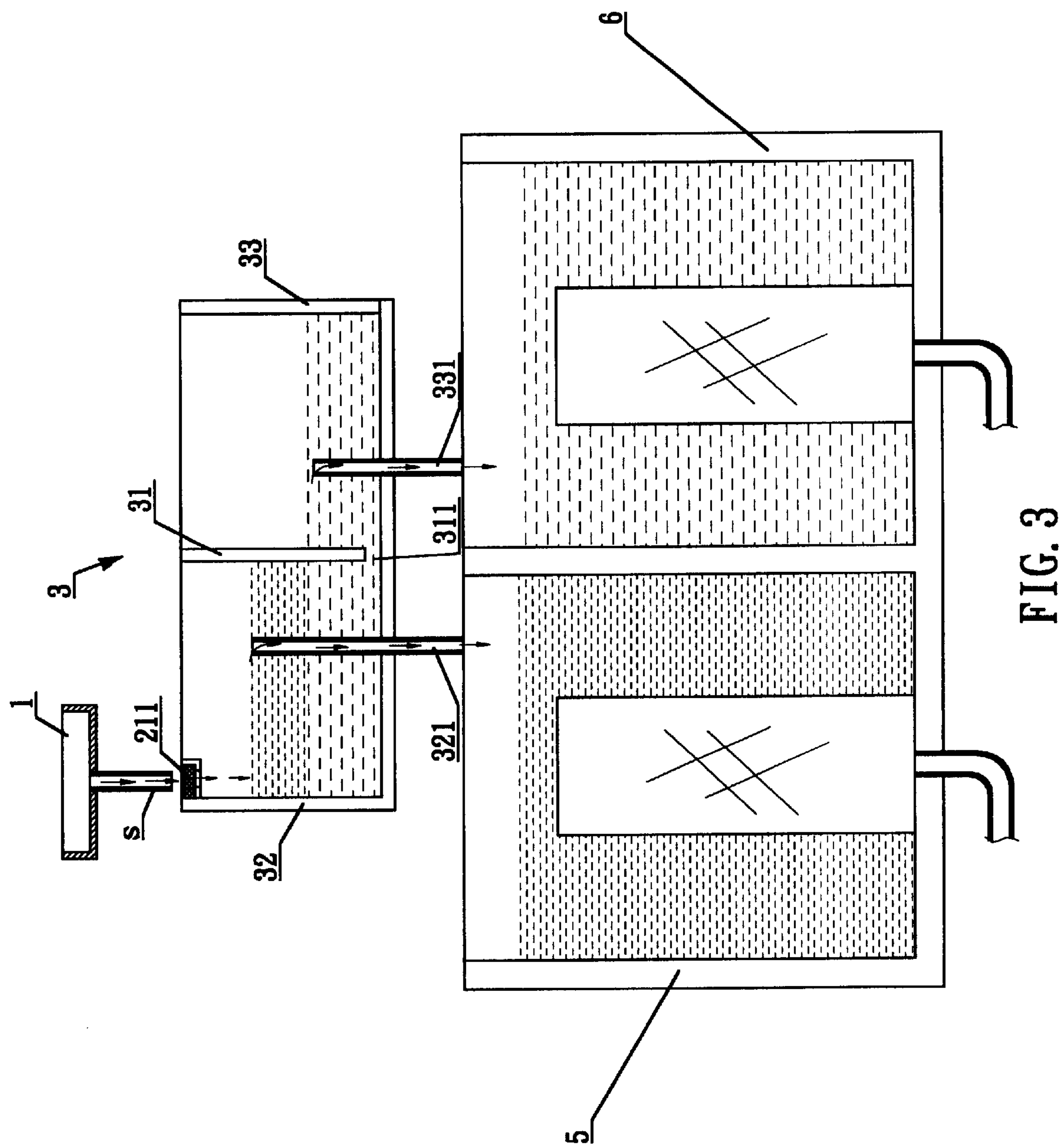
FIG. 3 is a schematic drawing of a dual-tank system for an electric-discharge fabrication machine according to the present invention.
Figure 4:
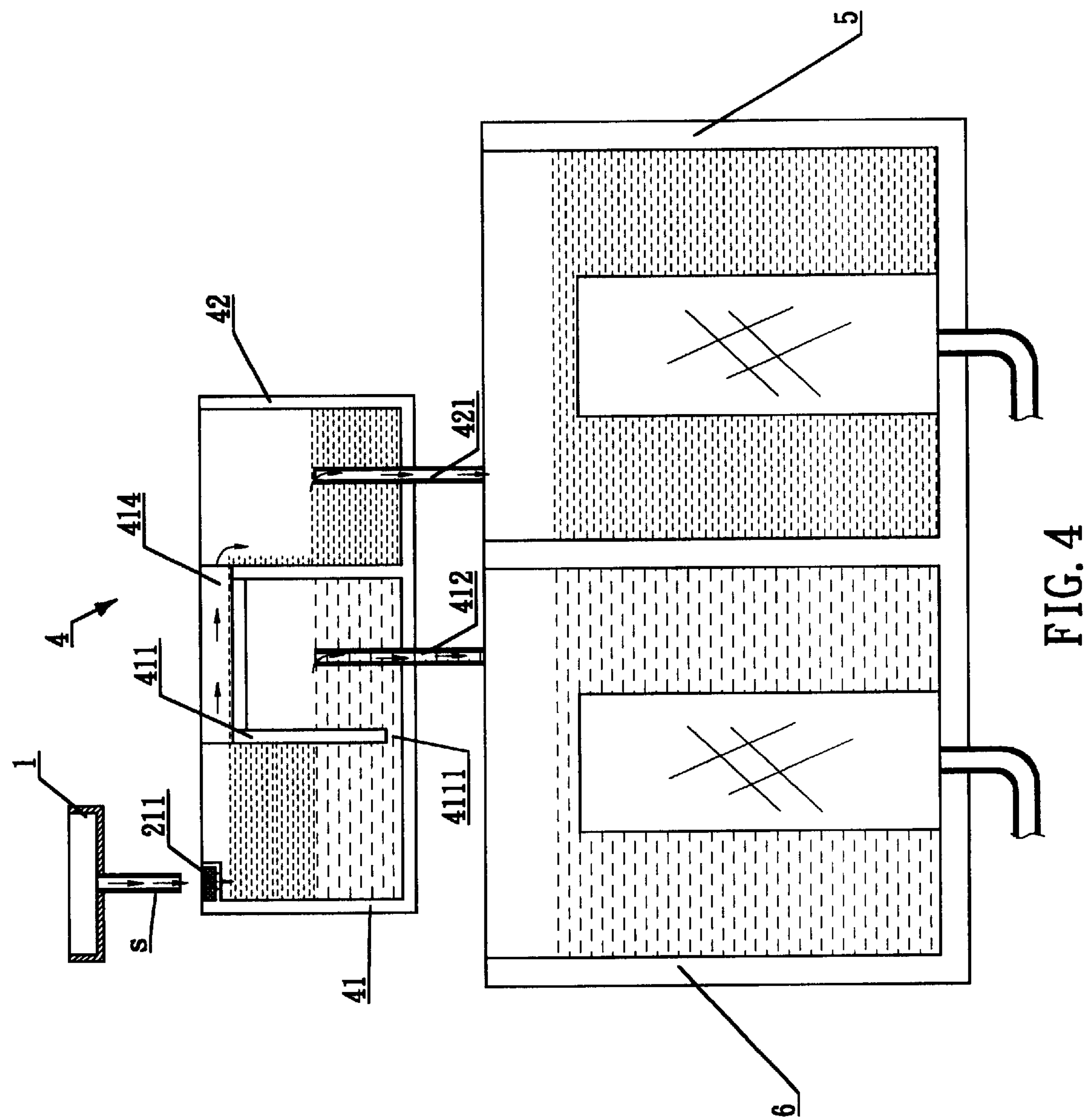
FIG. 4 is a schematic assembly drawing of a triple-tank system for an electric-discharge fabrication machine according to the present invention.

The structure and processing of the invention are clearly illustrated in FIGS. 2–4. The invention relates to equip an oily-water separation system 2 located connected to the bottom of fabrication liquid collection tank 1, by guiding pipe S. Oil storage tank 5 and water storage tank 6 are set below the oily-water separation system 2 with a filtration A respectively. The tanks are connected to an electric-discharge fabrication machine (not shown) for circulation of the fabrication liquid. The oily-water separation system can be designed and produced as single, dual, or triple tank types.

FIG. 2 illustrates a single-tank oily-water separation system which includes oily-water filtration net 211 at the water outlet of an oily-water separation system. The oily-water mixture fabrication liquid passes through oily-water filtration net 211 for filtrating impurities and steel pieces and enters oily-water mixture filtration tank 21, which includes oil discharge pipe 212 and water discharge pipe 213 on upper and lower ends, respectively. Electric magnetic valve 2131 is equipped on the water discharge pipe 213. Between the pipes, high water level sensor 214 and low water level sensor 215 are located. As shown sequentially in FIG. 2, initially the fabrication liquid is above the water discharge pipe. When the fabrication machine (not shown) starts functioning the electric discharge end of guiding pipe S continually releases oily-water fabrication liquid into the tank 21 to reach the lower water level sensor, electric magnetic valve 2131 on water discharge pipe 213 is in a state of OFF. Fabrication liquid is not able to continually flow from the water discharge pipe and slowly rises. Thus, as shown in FIG. 2, the oil on the top of fabrication liquid is discharged from water discharge pipe 212. If fabrication liquid continually rises and reaches high water level sensor 214, electric magnetic valve 2131 on water discharge pipe 213 is in a state of ON to avoid fabrication liquid becoming higher than the oil discharge pipe and entering oil storage tank 5. As shown, fabrication liquid is discharged from the water discharge pipe and the oil fabrication liquid until the oily-water mixture drops to the top of water discharge pipe 213.

Please refer to FIG. 3 for a dual-tank oily-water separation system which includes an oily-water filtration net 211 at the electric discharge end of guiding pipe S. The oily-water mixture fabrication liquid passes through oily-water filtration net 211 for filtrating impurities and steel pieces and enters oily-water mixture filtration tank 3 having separation board 31 in the center to form oil filtration tank 32 and water filtration tank 33. The bottom of separation board 31 has an opening 311. The bottoms of oil filtration tank 32 and water filtration tank 33 have, respectively, oil discharge pipe 321 and water discharge pipe 331 extended from appropriate locations in the interior of filtration tanks 32, 33 for connection of oil storage tank 5 and water storage tank 6. Fabrication liquid enters oil filtration tank 32 above opening 311. When the fabrication machine starts functioning and the electric discharge end of guiding pipe S continually releases oily-water mixture fabrication liquid, the oil floats on the top. Fabrication water passes opening 311, enters water filtration tank 33, and slowly rises to the top of water discharge pipe 331, and enters water storage tank 6 from water discharge pipe 331. The oil flows from oil discharge pipe 321 and enters oil storage tank 5 to achieve the effect of oily-water separation.

Please refer to FIG. 4 for a triple-tank oily-water separation system 4 which includes water filtration tank 41 and oil filtration tank 42. Water filtration tank 41 is divided into dual tanks by separation board 411, which has opening 4111 at the bottom. Also, electric discharge end of guiding pipe S discharges liquid into oily-water filtration net 211. The oily-water mixture fabrication liquid passes through oily-water filtration net 211 for filtrating impurities and steel pieces and enters water filtration tank 41. The bottoms of water filtration tank 41 and oil filtration tank 42 have, respectively, water discharge pipes 412, 421 extending from the filtration tanks. Water supply fabrication liquid flows from water discharge pipe 412 located on the bottom of water filtration tank 41 into water storage tank 6. Also, with the flow pipe 414 located on the very top of water filtration tank 41, the floating oil in the upper oil layer enters oil filtration tank 42 through flow pipe 414. Finally, the oil enters oil storage tank through oil discharge pipe 421 to achieve oily-water separation.

Th operation is as follows: oily-water mixture fabrication liquid from fabrication liquid collection tank 1 enters water filtration tank. Because the density of oil fabrication liquid is light, it flows on the top of water fabrication liquid, impurities and steel pieces sink on the bottom of water filtration tank. Then, the separated liquid may enter oil storage tank 5 and water storage tank 6 through single, dual or triple-tank oily-water separation systems to make the impurities and steel pieces in oily-water fabrication liquid sink on the bottom of water filtration tank.

The oily-water separation systems are directly installed on the top of an oil storage tank and a water storage tank. Thus, no additional space is required for the structure, and the volume of oil storage tank 5 and oil storage tank 6 is increased within limited space. The circulation speed of fabrication liquid decreases and the temperature rises to eliminate the situation of oily-water impurity. Also, because the volume of oily-water separation system for filtrating impurities and steel pieces is shortened, the effects of reducing clean area and cleaning convenience are achieved.

The above explanation is a substantial embodiment of the invention, which provides greater practical performance than products of prior art.

What is claimed is:

1. A dual fabrication liquid circulatory system for an electric discharge fabrication machine comprising:

a) a water storage tank;

b) an oil storage tank;

c) an oily-water mixture filtration tank located above the water and oil storage tanks and adapted to receive an oily-water mixture therein, the oily-water mixture filtration tank including: a water discharge pipe having a water inlet within the oily-water filtration tank and communicating with the water storage tank; and an oil discharge pipe having an oil inlet within the oily-water filtration tank and communicating with the oil storage tank, wherein the oil inlet is located higher than the water inlet;

d) a valve located in the water discharge pipe; and, e) high and lower water level sensors located within the oily-water mixture filtration tank, the low water level sensor located adjacent to and above the water inlet and the high water level sensor located adjacent to and below the oil inlet, the water level sensors controlling the valve such that the valve is closed when a water level in the oily-water mixture filtration tank is below the low water level sensor and remains closed until the water level reaches the high water level sensor, at which time the valve opens and remains open until the water level reaches the lower water level sensor, at which time the valve is closed.

2. A dual fabrication liquid circulatory system for an electric discharge fabrication machine comprising:

a) a water storage tank;

b) an oil storage tank; and, c) an oily-water mixture filtration tank located above the water and oil storage tanks and adapted to receive an oily-water mixture therein; the oily-water mixture filtration tank including: a separation board dividing the oily-water mixture filtration tank into a water filtration tank and an oil filtration tank, the separation board having an opening through a lower portion enabling liquid communication between the water and oil filtration tanks; a water discharge pipe having a water inlet located in the water filtration tank above the opening through the separation board, the water discharge pipe communicating with the water storage tank; and an oil discharge pipe having an oil inlet in the oil filtration tank located above the water inlet, the oil discharge pipe communicating with the oil storage tank.

3. A dual fabrication liquid circulatory system for an electric discharge fabrication machine comprising:

a) a water storage tank;

b) an oil storage tank; and, c) an oily-water mixture filtration tank located above the water and oil storage tanks and adapted to receive an oily-water mixture therein, the oily-water mixture filtration tank including: a water filtration tank having a separation board dividing the water filtration tank into a receiving portion, in which the oily-water mixture is received and a discharging portion, the separation board having an opening through a lower portion enabling communication between the receiving and discharging portions; a water discharge pipe having a water inlet located in the discharging portion of the water filtration tank above the opening through the separation board, the water discharge pipe communicating with the water storage tank; an oil filtration tank; a flow pipe located above the water inlet and communicating with the oil filtration tank and the receiving portion of the water filtration tank enabling oil to flow from the receiving portion into the oil filtration tank; and an oil discharge pipe having an oil inlet in the oil filtration tank and communicating with the oil storage tank.

* * * * *